(12) United States Patent
Ying et al.

(10) Patent No.: US 9,800,801 B2
(45) Date of Patent: Oct. 24, 2017

(54) TECHNIQUES FOR PROCESSING SUBTITLES

(71) Applicant: INTEL CORPORATION, Santa Clara, CA (US)

(72) Inventors: Zhiwei Victor Ying, Shanghai (CN); Changliang Charlie Wang, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 413 days.

(21) Appl. No.: 14/379,036

(22) PCT Filed: Dec. 17, 2013

(86) PCT No.: PCT/CN2013/089718
§ 371 (c)(1),
(2) Date: Aug. 15, 2014

(87) PCT Pub. No.: WO2015/089746
PCT Pub. Date: Jun. 25, 2015

(65) Prior Publication Data
US 2016/0286140 A1    Sep. 29, 2016

(51) Int. Cl.
*H04N 5/278*     (2006.01)
*H04N 21/488*    (2011.01)
*H04N 21/431*    (2011.01)

(52) U.S. Cl.
CPC ......... *H04N 5/278* (2013.01); *H04N 21/4316* (2013.01); *H04N 21/4884* (2013.01)

(58) Field of Classification Search
CPC .............. H04N 5/44504; H04N 5/278; H04N 21/4316; H04N 21/4884; H04N 7/0882

USPC ......................................... 348/589, 468, 600
IPC .......... H04N 5/278,5/445, 9/74, 21/488, 21/431
See application file for complete search history.

(56) References Cited

U.S. PATENT DOCUMENTS

| | | | |
|---|---|---|---|
| 6,088,064 A * | 7/2000 | Rumreich | H04N 5/45 348/468 |
| 7,280,158 B2 | 10/2007 | Matsubara | |
| 7,848,615 B2 | 12/2010 | Tsai et al. | |
| 2009/0256959 A1* | 10/2009 | Kondo | H04N 5/44513 348/468 |

FOREIGN PATENT DOCUMENTS

| | | |
|---|---|---|
| CN | 1992861 | 7/2007 |
| CN | 101360193 | 2/2009 |

OTHER PUBLICATIONS

International Search Report and Written Opinion received for PCT Patent Application No. PCT/CN2013/089718, mailed Sep. 29, 2014, 13 pages.

* cited by examiner

*Primary Examiner* — Sherrie Hsia

(57) ABSTRACT

Various embodiments are generally directed an apparatus and method for determining a size of a subtitle area in a subtitle image comprising subtitle information, creating a new subtitle image comprising the subtitle information, the new subtitle image having a same size as the size of the subtitle area and is smaller than the subtitle image and combining the new subtitle image with a video image for presenting the subtitle information.

22 Claims, 10 Drawing Sheets

600

DETERMINING A SIZE OF A SUBTITLE AREA IN A SUBTITLE IMAGE COMPRISING SUBTITLE INFORMATION
605

CREATING A NEW SUBTITLE IMAGE COMPRISING THE SUBTITLE INFORMATION, THE NEW SUBTITLE IMAGE HAVING A SAME SIZE AS THE SIZE OF THE SUBTITLE AREA AND IS SMALLER THAN THE SUBTITLE IMAGE
610

COMBINING THE NEW SUBTITLE IMAGE WITH A VIDEO IMAGE FOR PRESENTING THE SUBTITLE INFORMATION
615

*FIG. 6*

TECHNIQUES FOR PROCESSING SUBTITLES

CROSS REFERENCING TO RELATED APPLICATION(S)

The present application is claiming priority from pending International Patent Application No. PCT/CN2013/089718, entitled "TECHNIQUES FOR PROCESSING SUBTITLES" filed on Dec. 17, 2013 and claims priority there from.

TECHNICAL FIELD

Embodiments described herein generally relate to processing subtitles for a display scene.

BACKGROUND

Subtitling for Audio-Visual (AV) material has been used beginning with the first celluloid cinema movies and further until the recent digital media appeared. Subtitles are textual versions of the dialog or commentary in films, television programs, video games, video streams and the like, usually displayed at the bottom or top of a display scene. The subtitles can either be a form of written translation of a dialog in a foreign language, or a written rendering of the dialog in the same language, with or without added information to help viewers who are deaf and hard-of-hearing to follow the dialog, or people who cannot understand the spoken dialogue or who have accent recognition problems.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 illustrates an embodiment of a logic flow diagram for processing subtitle images.

DETAILED DESCRIPTION

Figure 1:
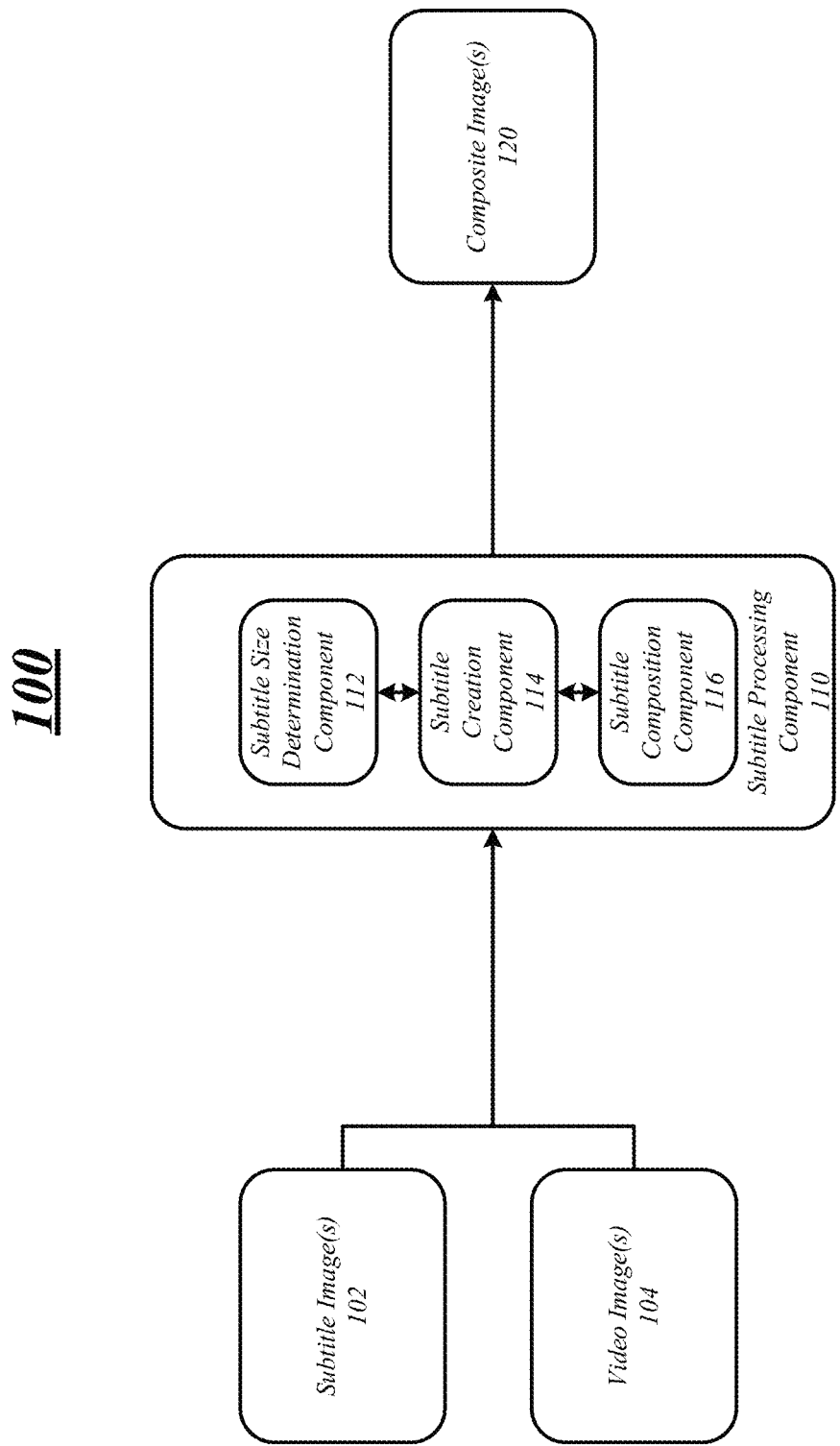
FIG. 1 illustrates a first of a computing system for processing subtitles for a display scene.

As previously discussed, subtitles may include subtitle information or textual information of dialog or commentary in films, television programs, video games, video streams and the like, usually displayed at the bottom or top of a display scene. In various embodiments, the subtitle information may be presented to a viewer of the film, television program, video games, video streams, in one or more composite images. A composite image may be formed from the combination of a subtitle image having the subtitle information and a video image or frame of a video stream. More specifically, a subtitle image and a video image may be read from memory and written to a buffer, such as a framebuffer to form a composite image and for presentation on a display device.

Typically, the subtitle image is the same size as the video image and includes a background and the subtitle information. Moreover, the subtitle information generally only occupies a small amount of space of the subtitle image and the majority of space is occupied by the background. However, the entire subtitle image including the background and the subtitle information may be read from memory and written to a framebuffer. A viewer of the composite image is only concerned with the subtitle information in the subtitle image. Thus, significant processing cycles, bandwidth and power is wasted when the entire subtitle image is read from memory and written to the framebuffer when the subtitle image is larger than the subtitle area around the subtitle information.

Various embodiments are generally directed to determining the size of the subtitle area including the subtitle information and generating a new subtitle image a same size as the subtitle area to combine with the video image to form the composite image for presentation to a viewer. Significant performance increases may be realized by generating a smaller subtitle image because the processing requires less reads from memory and writes to a framebuffer.

As will become apparent will the follow description, a full size subtitle image may be scanned to determine where the subtitle information is located within the subtitle image and the size of the subtitle area having the subtitle information. This information may be used to generate the new and smaller subtitle image, which in turn may be combined with a video image to form a composite image.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of a computing system 100 for processing subtitles for a display scene. More specifically, FIG. 1 illustrates a subtitle processing component 110 including a subtitle size determination component 112, a subtitle creation component 114 and subtitle composition component 116 for processing subtitle images. In various embodiments, the components of computing system 100 may be stored in one more memories, storage devices, storage mediums, and so forth and executed on processing circuitry, a processing component, a processor, a graphics processing unit, or the like. Further, the components of computing system 100 may be implemented in hardware only, software only or combination thereof.

In various embodiments, subtitle processing module 110 may retrieve or receive one or more subtitle images 102 and one or more video images 104 from memory, a storage device, storage medium, over one or more interconnects such as a wired or wireless network link. In some embodiments, the subtitle images 102 and the video images 104 may be from the same location or different locations.

The subtitle processing component 110 may receive the images and combine or compose the subtitle images 102 and video images 104 into composite images 120 for displaying in a display scene on a display device. In some embodiments, one subtitle image 102 may correspond to a plurality of video images 104. Thus, the same subtitle image 102 may be combined with a plurality of video images 104 to create a plurality of composite images 120. Further, the composite images 120 may be sent to one or more display processing subsystems, such as a graphics processing unit for processing and presenting on a display device.

In various embodiments, the subtitle image 102 may include a background and subtitle information for the video image 104. The subtitle information may be textual information corresponding to audio information for the video image. Further, the textual information may be in any language and displayed on a display device. The background is generally black or white and the subtitle information may be the opposite color such as white or black. However various embodiments are not limited in this manner, the background color and the text color may be any color.

The video images 104 may be an image or frame of a video stream for displaying to a user on a display device. For example, the video image 104 may be a frame of a video stream such as a movie, video, television show and so forth. The video mage 104 may have corresponding audio information that outputs audio to one or more speakers for a user to hear while watching the video stream. Further and as previously discussed, the subtitle image may include subtitle information corresponding to the audio information for the user to read on the display device.

In various embodiments, subtitle image 102 and video image 104 may be any type of image including but not limited to a raster format such as Joint Photographic Experts Group (JPEG), Exchangeable graphic file format (Exif), Tagged Graphic File Format (TIFF), raw graphic format (RAW), graphics interchange format (GIF), bitmap (BMP), portable network graphics (PNG), portable arbitrary format (PAM), and any vector format such as computer graphics metafile (CGM), scalable vector graphics (SVG), etc. Furthermore, the subtitle image 102 and video image 104 may be a frame in video stream and may be in any video format such as a Moving Pictures Experts Group (MPEG) format, Advanced Television Systems Committee (ATSC) format, Digital Video Broadcast (DVB) format, Integrated Services Digital Broadcasting (ISDB) format, Digital Multimedia Broadcasting (DMB) format, National Television System Committee (NTSC) format, Phase Alternating Ling (PAL) format, and so forth.

In some embodiments, subtitle image 102 may be in a subtitle format such as AQTitle format, JACOSub format, Micro Digital Versatile Disc (DVD) format, MPEG-4 Timed Text format, MPlayer MP Sub format, Ogg Write format, Phoenix Subtitle format, PowerDivX format, RealText format, Synchronized Accessible Media Interchange (SAMI) format, Structured Subtitle Format, SubRip format, Universal Subtitle Format (USF), VobSub format, XSub format, and so forth. Both, the subtitle image 102 and video image 104 are not limited to above-recited formats and may be in any format.

The subtitle processing component 110 may receive and process the subtitle image 102 and the video image 104 to present a composite image 120 including the subtitle image 102 and the video image 104. Typically, the subtitle image 102 is the same size as the video image 104 and each must be processed by one or more graphics processing components and/or a graphics processing unit to present the composite image 120 on a display device to a user. However, processing the entire subtitle image 102 when it is the same size as the video image 104 may use extra processing cycles, bandwidth and power. Thus, various embodiments are directed to the subtitle processing component 110 reducing the size of the subtitle image 102 prior to processing it for display on display device. As will be discussed in more detail below, the size of a subtitle area in the subtitle image 102 having the subtitle information may be determined and a new subtitle image may be generated having the same size of the subtitle area to combine with the video image 104 to present on a display device.

More specifically, the subtitle size determination component 112 may receive the subtitle image 102 and determine the subtitle area size by scanning the subtitle image 102 on a pixel line basis. For example, the subtitle size determination component 112 may scan the entire subtitle image 102 on line-per-line basis to determine if subtitle information is in a particular line of the subtitle image 102. As will be discussed in more detail below, the subtitle size determination component 112 may scan the subtitle image 102 in a top-to-bottom manner or a bottom-to-top manner based on a determined location of subtitle information in a first subtitle image 102.

Each subtitle image 102 may be made up of and include a number of pixels in rows and columns and each pixel may have a pixel value indicating the color of the pixel in the subtitle image 102. In various embodiments, the subtitle size determination component 112 may read each row or line of pixels and sum up the pixel values of a row or line to determine if subtitle information is in that row or line. The subtitle size determination component 112 may receive information indicating the color and pixel value for the subtitle information. For example, the background of the subtitle image 102 may be white and the subtitle information may be black. Thus, the pixel value for the subtitle information may be 0×00 or zero. In this example, when scanning the subtitle image 102, the rows or lines having a summation of 0×00 may indicate that the line includes subtitle information. However, in another example, the background of the subtitle image 102 may be black and the color of the subtitle information may be white. The color or pixel value for the subtitle information may be 0×ff or the color code for white. Therefore, when scanning the subtitle image 102, the rows or lines having a summation of 0×ff may indicate that the line includes subtitle information. Various embodiments are not limited to these examples. As previously discussed, the subtitle information may be any color and the subtitle size determination component 112 may determine when a line has subtitle information of any color.

In various embodiments, the subtitle size determination component 112 may determine when a row or line of pixels has subtitle information based on a change in the summation of pixel values. For example, the subtitle information is typically not in the first or last line of the subtitle image 102. Thus, the first and last lines of the subtitle image 102 will the background color. The subtitle size determination component 112 may scan each line of the subtitle image 102 and determine when there is a change from the background color indicating that subtitle information is be in that row or line.

The subtitle size determination component 112 may determine the size of the subtitle area by determining a minimum line value and a maximum line value of the subtitle image 102 having subtitle information and determining the number lines between and including the minimum line value and the maximum line value. In some embodiments, the minimum line value may be the lowest numbered line having the subtitle information in the subtitle image 102 and the maximum line value may be the highest numbered line having the subtitle information. For example, the subtitle image 102 may be made up of a 100 lines of pixels, from 0 to 99 where the top line is 0 and the bottom line is 99. In this example, the subtitle information may be located near the bottom of the subtitle image 102 in lines 75 through 85. Therefore, the minimum line value is 75 and the maximum line value is 85 in this example. Further, the size of the subtitle area may be 11 lines, the number of lines between and including 75 and 85. The minimum line value and maximum line value will be the same whether the subtitle size determination component 112 is scanning from top-to-bottom or bottom-to-top.

In some embodiments, the subtitle size determination component 112 may scan the subtitle image 102 from top-to-bottom or bottom-to-top based on whether the subtitle information is in a top portion or a bottom portion of the subtitle image 102. More specifically, the subtitle size determination component 112 may scan from the top-to-bottom when the subtitle information is at the top portion of the subtitle image 102 and scan from the bottom-to-top when the subtitle information is at the bottom portion of the subtitle image 102.

The subtitle size determination component 112 may determine which order to scan the subtitle image 102 based on a scan of a first subtitle image to determine where the subtitle information is located. More specifically, the subtitle size determination component 112 may scan a first subtitle image 102 corresponding to the first or first few video images 104 to determine the location of the subtitle information. Typically, the location of the subtitle information remains the same from one subtitle image 102 to the next subtitle image 102. Thus, the subtitle size determination component 112 may set the scan order to top-to-bottom or bottom-to-top for the rest of the subtitle images 102 corresponding to video images 104 of the video stream.

The subtitle size determination component 112 may save additional bandwidth, processing cycles and power by scanning in a particular order based on the location of the subtitle information. For example, when the subtitle information is located in the top portion of the subtitle image 102, scanning in a top-to-bottom order may be advantageous because the subtitle size determination component 112 will locate the subtitle information sooner in the scanning process order. Further, when the subtitle information is located in the bottom portion of the subtitle image 102, scanning in bottom-to-top order may be advantageous because the subtitle information will be located sooner. In some embodiments, the subtitle size determination component 112 may continue to scan the entire subtitle image 102 after finding the subtitle information. However, in the same or other embodiments, the subtitle size determination component 112 may stop scanning the subtitle image 102 after determining the minimum and maximum line values for the subtitle information. Thus, the entire subtitle image 102 is not scanned and unnecessary processing cycles are avoided.

The subtitle size determination component 112 may communicate the size of the subtitle area to the subtitle creation component 114 to create a new subtitle image. The new subtitle image will include the subtitle information or text for displaying with the video image 104. However, the new subtitle image will only be the size of the subtitle area determined by the subtitle size determination component 112. Continuing with the example discussed above, if the subtitle information is located between and included within lines 75 and 85, the subtitle creation component 114 will create a new subtitle image having 11 row or lines and include subtitle information. In various embodiments, the width of the new subtitle image may be the same size as the original subtitle image 102. However, in some embodiments, the width of the new subtitle image may be reduced in a similar manner as discussed above by scanning the subtitle from left-to-right or right-to-left and determining subtitle information in columns of the subtitle image 102.

In various embodiments, the subtitle creation component 114 may send or communicate the new subtitle image to the subtitle composition component 116 to combine with the video image 104 and generate composite image 120. The subtitle creation component 114 may combine the new subtitle image with the video image 104 by writing each image to a framebuffer on a pixel-by-pixel basis. More specifically, the subtitle creation component 114 may read and write every pixel for the new subtitle image into the framebuffer and every pixel for the video image 104 into the framebuffer. Thus, by reducing the size of the subtitle image 102 to the size of the new subtitle image, the subtitle composition component 116 has to do less reads from memory and writes to the framebuffer compared to the full size subtitle image 102. The framebuffer may then be read by one or more graphics processing components for presenting the composite image 120 on a display device. In some embodiments, the subtitle composition component 116 may send the new subtitle image and the video image 104 to other components of a graphics processing pipeline and graphics processing unit for processing and combining into the composite image 120.

Figure 2:
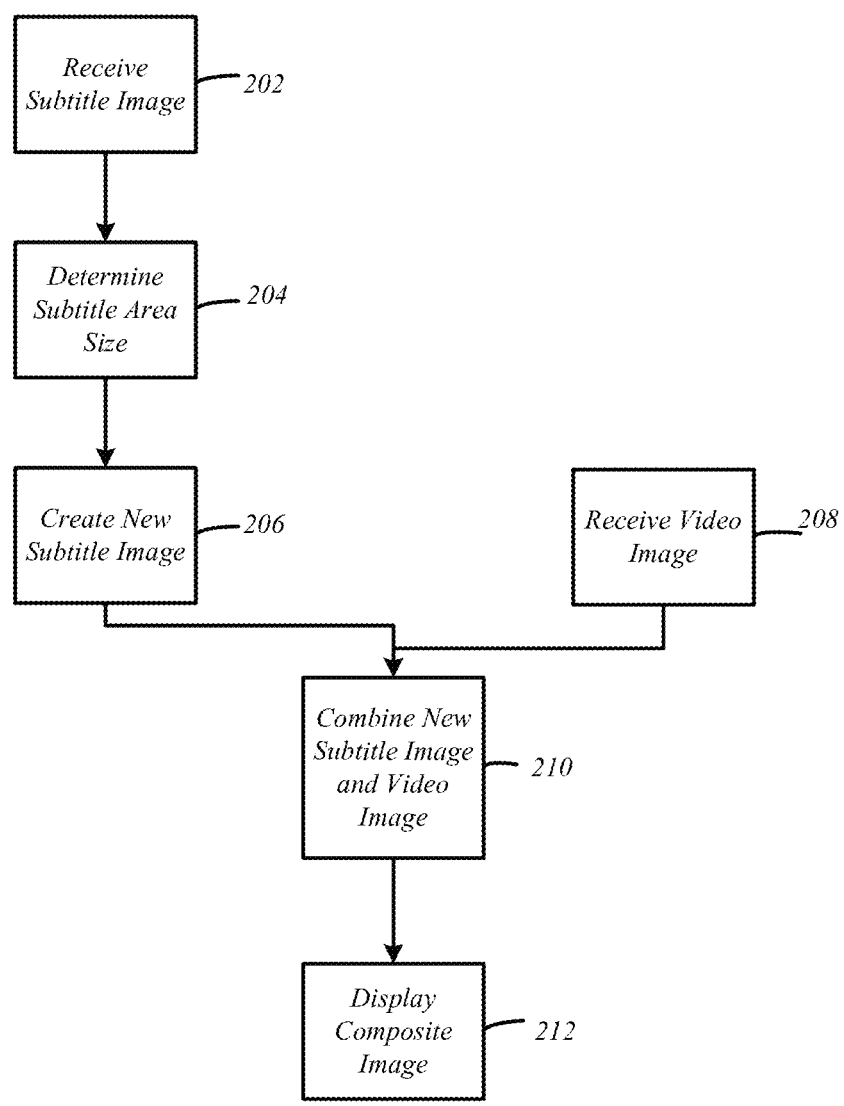
FIG. 2 illustrates a first logic flow diagram for presenting subtitle images and video images to a user.

FIG. 2 illustrates a first logical flow 200 for presenting subtitles on a display device with one or more video images. Logical flow 200 may be representative of some or all of the operations executed by one or more embodiments described herein. For example, the logic flow 200 may illustrate operations performed by the systems 100, 700 and 800.

At block 202, a subtitle image may be received for processing and presenting with a video image received at block 208. In some embodiments, the subtitle image and the video image may be received from a memory, a storage device, one or more interconnects over wired and wireless connections, and so forth. The subtitle image and video may be received from different locations via different communications means in some embodiments or same location.

The size of a subtitle area including subtitle information in the subtitle image may be determined at block 204. The size may be determined by scanning the subtitle image in a top-to-bottom manner or bottom-to-top manner and determining a minimum line value and a maximum line value for the subtitle information in the subtitle image. In some embodiments, the minimum line value may be the lowest numbered line having the subtitle information in the subtitle image and the maximum line value may be the highest numbered line having the subtitle information. Further, the number lines between and including the minimum line value and the maximum line value may be determined and may be the size of the subtitle area having subtitle information.

In various embodiments, a new subtitle image may be created having a same size as the size of the subtitle area. The new subtitle image may include the number of lines of pixels as determined as having subtitle information in the original subtitle image. Further, the new subtitle image may include the subtitle information or text to be presented with the video image.

The new subtitle image may be combined with the video image at block 210. In some embodiments, the new subtitle image may be combined with the video image by writing each image to a framebuffer on a pixel-by-pixel basis. More specifically, every pixel from each of the images is read from memory and written to the framebuffer. Thus, by reducing the size of the subtitle image to the new subtitle image, less reads and writes must be done to present a composite image on a display device to a user.

Figure 3:
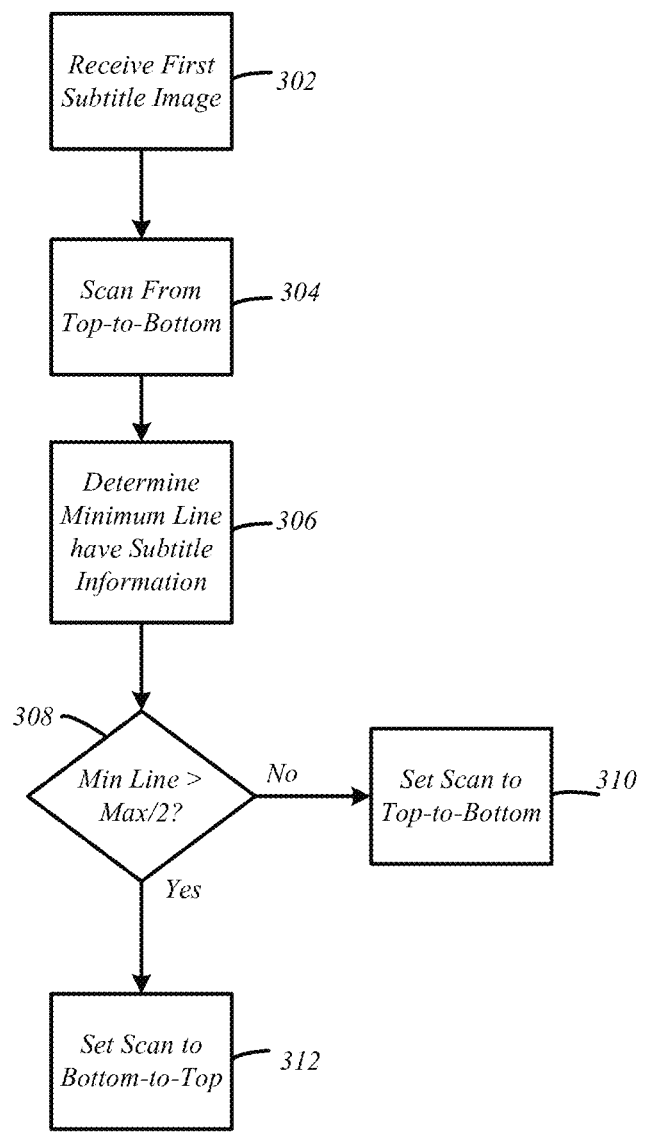
FIG. 3 illustrates a second logical flow diagram for determining a position of subtitle information in a subtitle image.

FIG. 3 illustrates a logic flow diagram 300 for determine the position or location of subtitle information in a subtitle image. As previously discussed, a subtitle image may be one of many subtitle images corresponding to video images for displaying to a user. Each subtitle image may include subtitle information or textual information in one or more languages corresponding to spoken dialogue in an audio stream for the video images. Typically, subtitle information may be presented in a same location from one subtitle image to the next subtitle image. Thus, it is advantageous to determine the location of the subtitle information to set the scan order for determining the size of the subtitle area.

A block 302, a first subtitle image is received for processing by processing circuitry and one or more processing components, such as a subtitle size determination component. The first subtitle image received may be the first one of a plurality of subtitle images to present to a user on a display device. The first subtitle image may be scanned or processed in a top-to-bottom manner at block 304. More specifically, each row or line of pixels of the subtitle image may be read and the pixel values of the row or line may be summed up to determine if subtitle information is in that row or line. As previously discussed, subtitle information may be in a particular row or column when the summation of the pixel values in that row are different than the background color of the subtitle image.

In various embodiments, the minimum line value having subtitle information may be determined at block 306. More specifically, while scanning the subtitle image in the top-to-bottom manner the first row having subtitle information may be indicated as the minimum line value. Once the minimum line value is determined, scanning the subtitle image from top-to-bottom may be stopped when determining the location of subtitle location for setting the scan order.

Further, logic flow 300 at decision block 308 may determine whether the subtitle information is a top portion or a bottom portion of the subtitle image based on the minimum line value having subtitle information. In some embodiments, the maximum line value for the subtitle image may be divided in half and if the minimum line value is greater than the maximum line value/2 then the subtitle information is in the bottom portion of the subtitle image. However if the minimum line value is less than the maximum line value/2, the subtitle information is a top portion of the subtitle image.

By way of example, assume that the subtitle image has a 100 lines or rows of pixels and the minimum line value having subtitle information is line 75. Thus, the minimum line value equals 75 and the maximum line value for the subtitle image equals 100 and dividing the maximum line value in half results in 50. Therefore, since 75 are greater than 50 the subtitle information is in a bottom portion of the subtitle image. However, if the minimum line value having subtitle information is line 25 for the same subtitle image, the subtitle information is in a top portion of the subtitle image because 25 is less than 50.

At block 310, the scanning or processing order may be set to top-to-bottom when the subtitle information is in the top portion of the subtitle image and at block 312 the order may be set to bottom-to-top when the subtitle information is in the bottom portion of the subtitle image. The scanning or processing order may be set to either, the top-to-bottom order or the bottom-to-top order when the minimum line value for the subtitle information equals half the maximum line value for the entire subtitle image.

Figure 4A:
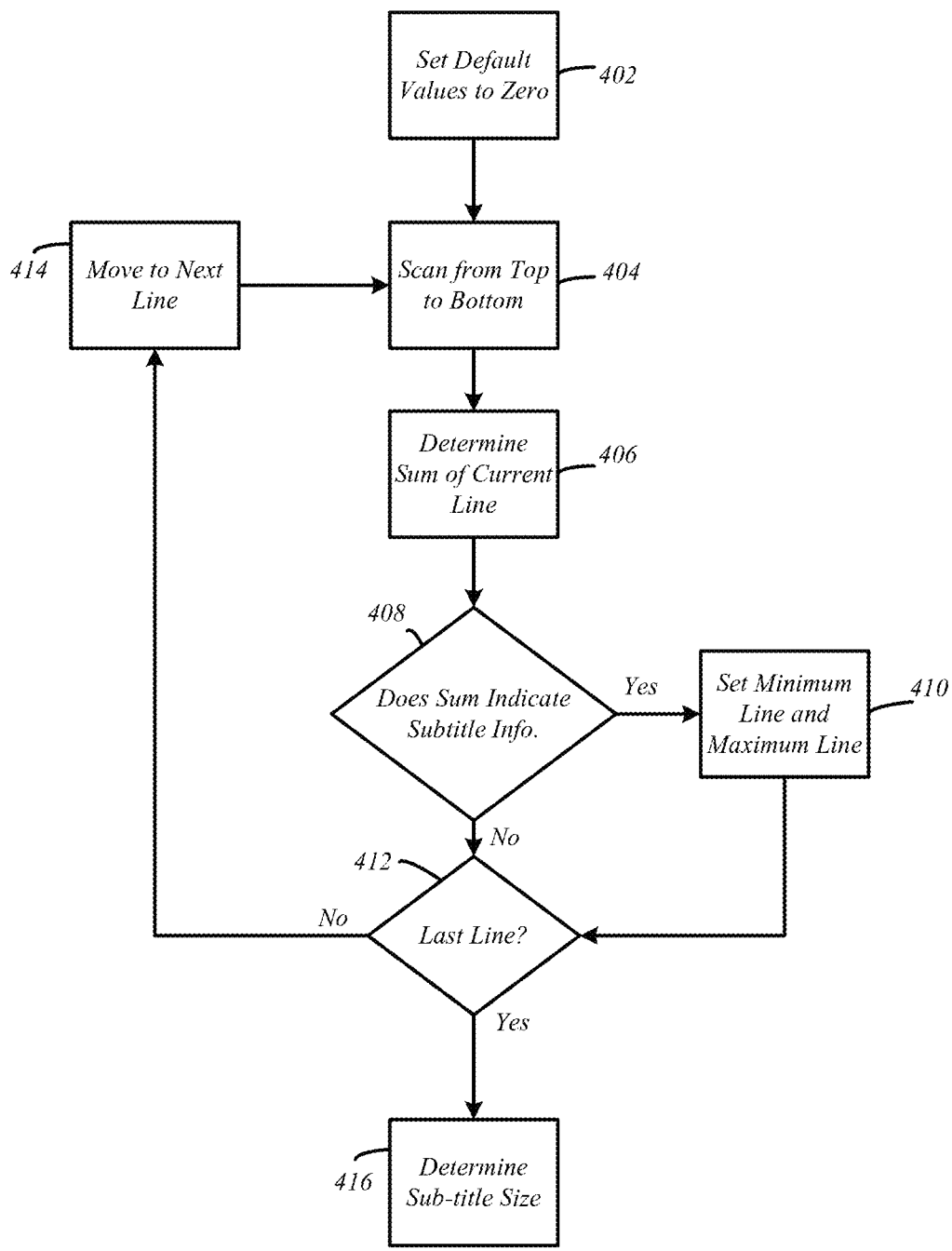
FIGS. 4A/4B illustrate embodiments of logic flow diagrams for determine the size of the subtitle area having subtitle information.
Figure 4B:
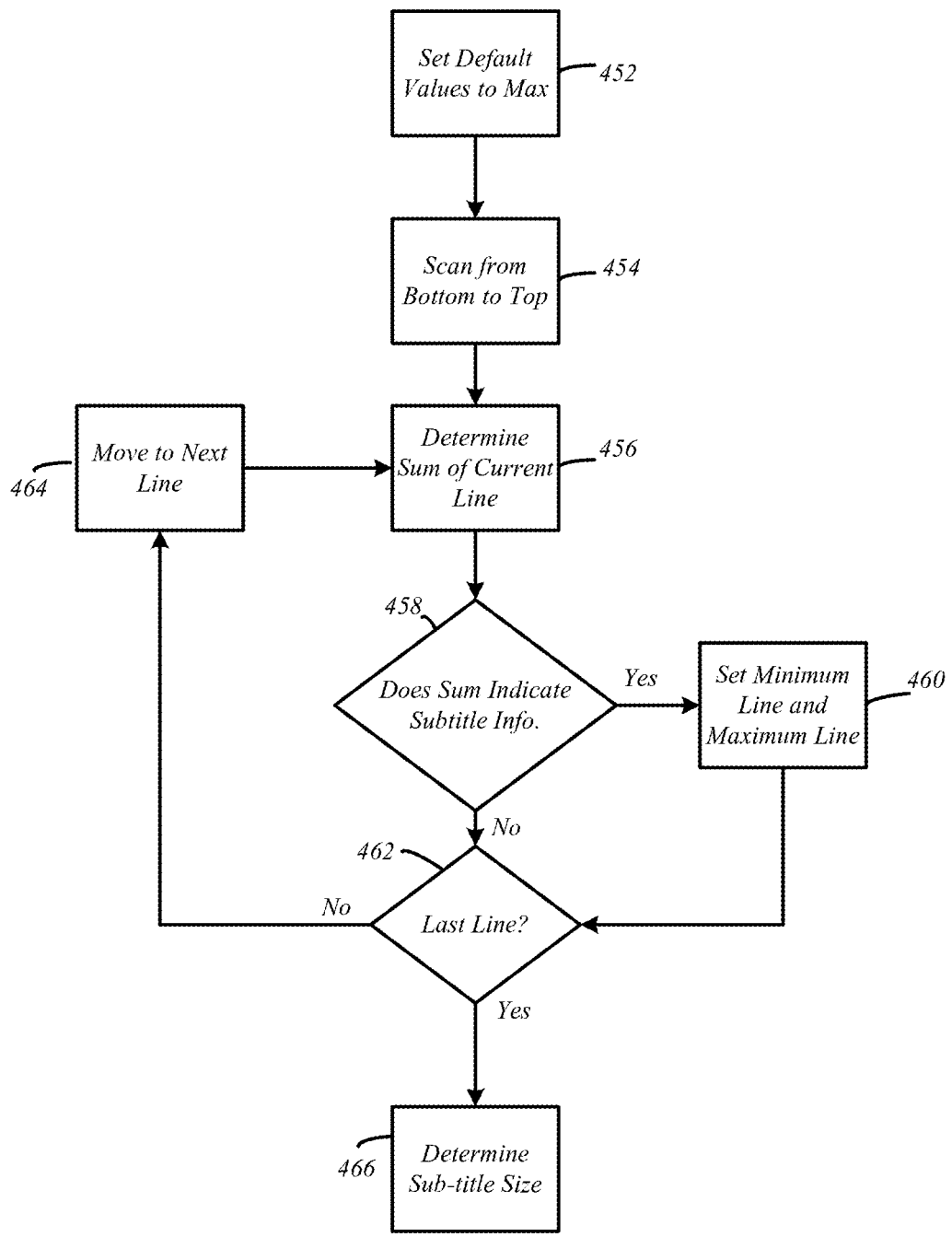

FIGS. 4A/4B illustrate embodiments of logic flows 400 and 450 for determine the size of a subtitle image in a subtitle image. FIG. 4A illustrates logic flow 400 for determine the size in a top-to-bottom manner and FIG. 4B illustrates logic flow 450 for determine the size in a bottom-to-top manner.

With respect to FIG. 4A, default values for the current scan line, and minimum line value and maximum line value having subtitle information may be set to 0 at block 402. Further scanning from the top-to-bottom of the subtitle image may be initiated at block 404. As previously discussed, the subtitle image may include a number of rows or lines having pixels or pixel values for presenting the image on a display device. Each line may be scanned to determine if subtitle information is presented within a particular line.

At block 406, each pixel value for each pixel in the particular or current line may be added together to determine a summation pixel value for the entire row. The summation pixel value may be used to determine whether subtitle information is present within the current line being scanned at decision block 408. For example, the color and pixel value for the subtitle information may be known and the subtitle information may be present when the summation pixel value equals the known value for the subtitle information. For example and as previously discussed, the background of the subtitle image may be white and the subtitle information may be black. Thus, the pixel value for the subtitle information may be 0×00 or zero. In this example, when scanning the subtitle image and the current line has a summation of 0×00 the line may include subtitle information. However, in another example, the background of the subtitle image may be black and the color of the subtitle information may be white. The color or pixel value for the subtitle information may be 0xff or the color code for white. Therefore, when scanning the subtitle image and the current line has a summation of 0xff for the summation pixel value the line may include subtitle information.

In various embodiments, the current row or line of pixels may be determined to have subtitle information based on a change in the summation of pixel values. For example, the subtitle information may not be typically in the first or last line of the subtitle image. Thus, the first and last lines of the subtitle image will be the background color. Thus each line may be scanned and a change from the background color may indicate that subtitle information is in the current row or line.

When the current line is determined to have subtitle information in it, the minimum line value having subtitle information and/or the maximum line value having subtitle information may be set at block 410. In some embodiments, the current line may be set as the minimum line value and the maximum line value the first time subtitle information is detected in the subtitle image. However, the minimum line value and maximum line value may be updated when additional rows or lines are determined to have subtitle information in it. For example, the minimum line value may be updated to a new current line value if the current line value is less than the minimum line value. Further, the maximum line value may be updated if the current line value is greater than the maximum line value. When scanning from top-to-bottom as illustrated by logical flow 400, the minimum line value will be set to the first line having subtitle information in it and the maximum line value will be set to the last line having subtitle information in it.

In various embodiments, logic flow 400 may determine if the current line is the last line for the subtitle image at decision 412. When the current line is not the last line, the scanning process may move to the next line in the subtitle image at block 414 and the subtitle information determination process may be repeated until all lines of the subtitle image are processed. If the current line is the last line in the subtitle image the subtitle information determination process may end. In some embodiments, the subtitle determination process may end when subtitle information is no longer detected after detecting subtitle information but before all the lines of the subtitle image are processed.

At block 416, the size of the subtitle area may be determined based on the minimum line value having subtitle information and maximum line value having subtitle information. More specifically, the number lines between and including the minimum line value and the maximum line value may be determined. In some embodiments, the minimum line value may be the lowest numbered line having the subtitle information in the subtitle image and the maximum line value may be the highest numbered line having the subtitle information. For example, the subtitle image may be made up of a 100 lines of pixels, from 0 to 99 where the top line is 0 and the bottom line is 100. In this example, the subtitle information may be located near the top of the subtitle image in lines 25 through 35. Therefore, the minimum line value is 25 and the maximum line value is 35 in this example. Further, the size of the subtitle area may be determined to be 11 lines, the number of lines between and including 25 and 35.

FIG. 4B is similar to FIG. 4A, but determines the size of a subtitle area by scanning the subtitle image from bottom-to-top. In logic flow 450, default values for the current scan line, and minimum line value and maximum line value having subtitle information may be set to the maximum line value for the subtitle image at block 452. Further scanning from the bottom-to-top of the subtitle image may be initiated at block 454. As previously discussed, the subtitle image may include a number of rows or lines having pixels or pixel values for presenting the image on a display device. Each line may be scanned to determine if subtitle information is presented within a particular or current line.

At block 456, each pixel value for each pixel in the current line may be added together to determine a summation pixel value for the entire row. The summation pixel value may be used to determine whether subtitle information is present within the current line being scanned at decision block 458, as previously discussed.

When the current line is determined to have subtitle information in it, the minimum line value having subtitle information and/or the maximum line value having subtitle information may be set at block 460. In some embodiments, the current line may be set as the minimum line value and the maximum line value the first time subtitle information is detected in the subtitle image. However, the minimum line value and maximum line value may be updated when additional rows or lines are determined to have subtitle information in it. For example, the minimum line value may be updated to a new current line value if the current line value is less than the minimum line value. Further, the maximum line value may be updated if the current line value is greater than the maximum line value. When scanning from bottom-to-top as illustrated by logical flow 450, the minimum line value will be set to the last line detected as having subtitle information in it and the maximum line value will be set to the first line detected as having subtitle information in it.

In various embodiments, logic flow 450 may determine if the current line is the last line for the subtitle image at decision 462. When the current line is not the last line, the scanning process may move to the next line in the subtitle image at block 464 and the subtitle information determination process may be repeated until all lines of the subtitle image are processed. If the current line is the last line in the subtitle image the subtitle information determination process may end. In some embodiments, the subtitle determination process may end when subtitle information is no longer detected after detecting subtitle information but before all the lines of the subtitle image are processed.

At block 456, the size of the subtitle area may be determined based on the minimum line value having subtitle information and maximum line value having subtitle information. More specifically, the number lines between and including the minimum line value and the maximum line value may be determined. In some embodiments, the minimum line value may be the lowest numbered line having the subtitle information in the subtitle image and the maximum line value may be the highest numbered line having the subtitle information. For example, the subtitle image may be made up of a 100 lines of pixels, from 0 to 99 where the top line is 0 and the bottom line is 99. In this example, the subtitle information may be located near the bottom of the subtitle image in lines 75 through 85. Therefore, the minimum line value is 75 and the maximum line value is 85 in this example. Further, the size of the subtitle area may be determined to be 11 lines, the number of lines between and including 75 and 85.

Figure 5A:
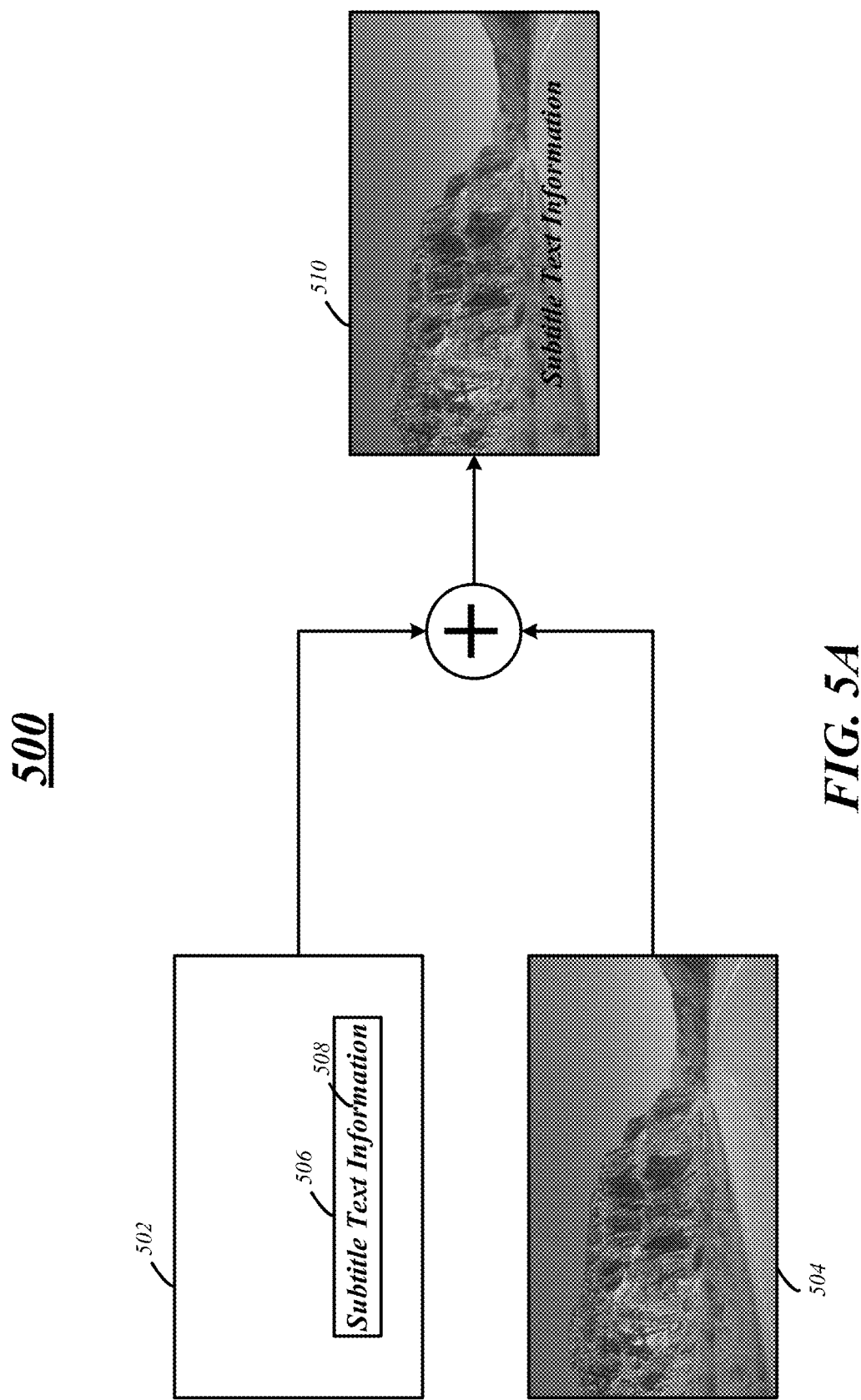
FIGS. 5A/5B illustrate embodiments a process flow for combining images to present a composite image.

FIGS. 5A/5B illustrate process flow diagrams 500 and 550 for images to form a composite image to present on a display device. FIG. 5A illustrates process flow 500 for combining a full size subtitle image 502 with a video image 504 to form composite image 510. Further, FIG. 5A illustrates the full size subtitle image 502 having subtitle information 508 in a subtitle area 506. As previously discussed the subtitle information may be textual information in any language to display to a user watching a video stream having video images. The subtitle information 508 may include the text of the speech or dialogue for one or more video images in the video stream.

The subtitle image may be combined with the video image by writing pixels for each image to a framebuffer on a pixel-by-pixel basis. Thus, when the subtitle image is a full size subtitle image, more pixels must be read from memory and written to the framebuffer to combine and display in the composite display image 510.

Figure 5B:
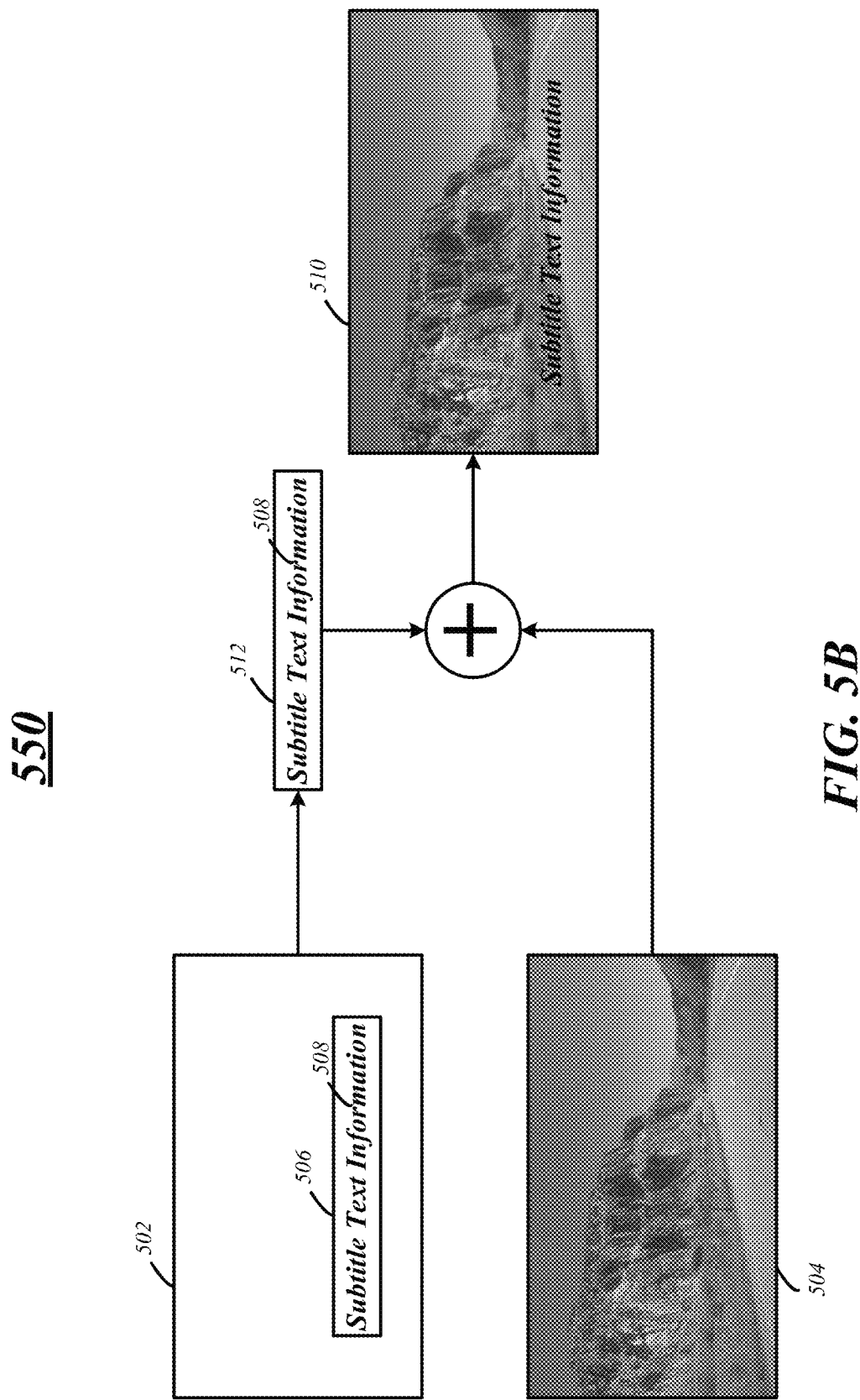

FIG. 5B illustrates another embodiment of process flow 550 for combining a subtitle image 512 with a video image 504 for presentation on a display device. However, in this example the size of the subtitle image is reduced or a new subtitle image 512 is generated having the same size of the subtitle area 506 including the subtitle information 508. As previously, the size of the subtitle area may be determined and a new subtitle image 512 may be created having the subtitle information 508. In this example, the number of reads from memory and writes to the framebuffer are less than the when the full size subtitle image 502 is combined with the video image 504. Thus, processing cycles and bandwidth are reduced and power consumption is saved by not processing the extra pixels of the full size subtitle image 502.

FIG. 6 illustrates an exemplary embodiment of logic flow 600. The logic flow 600 may be representative of some or all of the operations executed by one or more embodiments described herein. For example, the logic flow 600 may illustrate operations performed by the system 100, 700 and 800.

In the illustrated embodiment shown in FIG. 6, the logic flow 600 may include determining a size of a subtitle area in a subtitle image comprising subtitle information at block 605. More specifically, a subtitle image may be scanned or processed and the size of the subtitle area having the subtitle information may be determined. In various embodiments, the size of the subtitle area may be a number of lines of pixels having subtitle information in it. Each row or line of pixels may be scanned to determine if subtitle information is in a particular line.

In some embodiments, logical flow 600 may also include creating a new subtitle image comprising the subtitle information, the new subtitle image having a same size as the size of the subtitle area and is smaller than the subtitle image at block 615. More specifically, the new subtitle image may have the same number of rows or lines as the subtitle area having the subtitle information. Thus, the total number of rows of pixels in the new subtitle image is significantly less than the number of rows of pixels in the full size subtitle image.

At block 615, the logic flow may include combining the new subtitle image with a video image for presenting the subtitle information. In particular, the new subtitle image may be combined with the video image by writing pixels for each image to a framebuffer on a pixel-by-pixel basis. Thus, when the subtitle image is smaller than the full size subtitle image, fewer pixels must be read from memory and written to the framebuffer for combining with a video image and displaying in a composite image.

Figure 7:
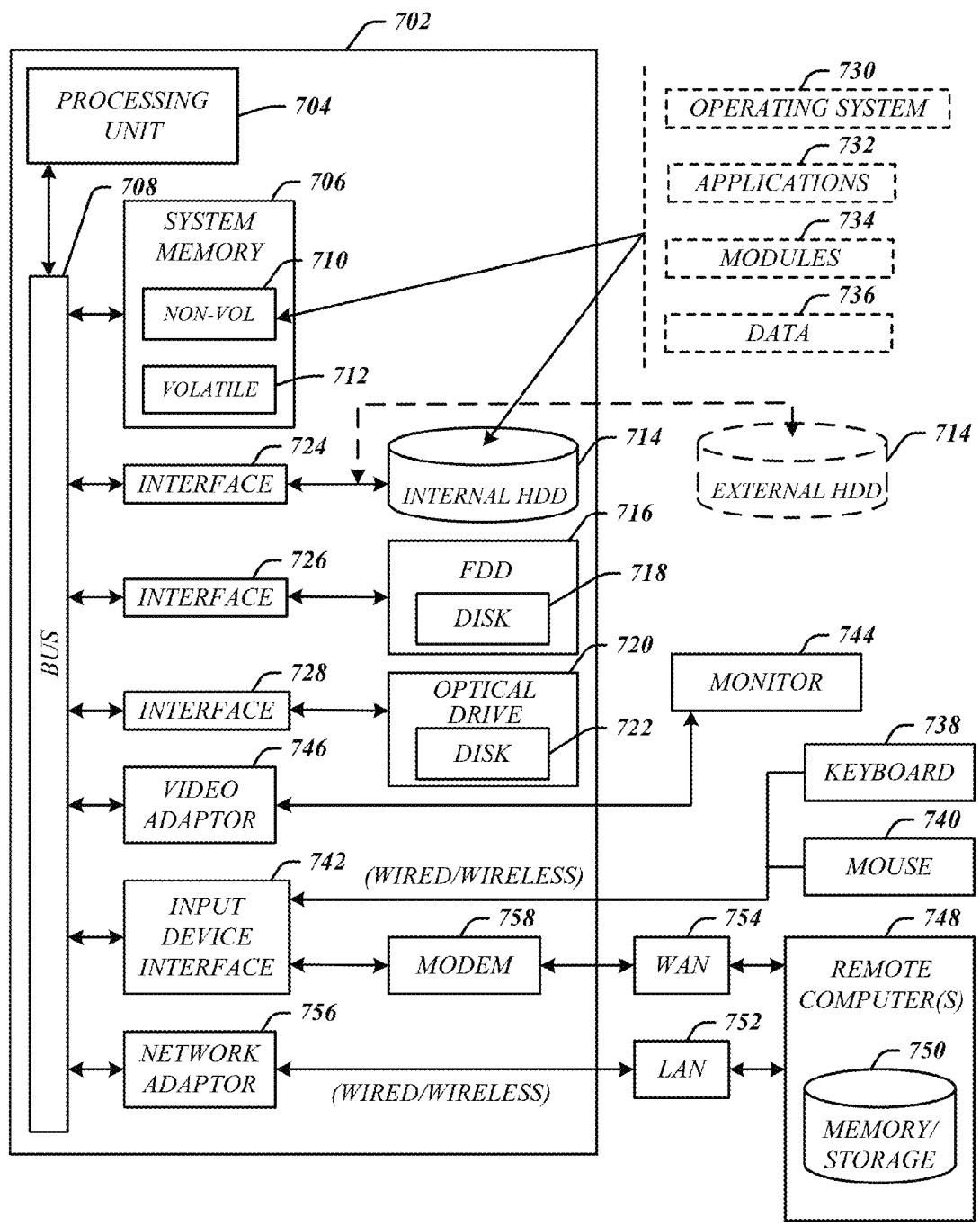
FIG. 7 illustrates an embodiment of a first computing architecture.

FIG. 7 illustrates an embodiment of an exemplary computing architecture 700 suitable for implementing various embodiments as previously described. In one embodiment, the computing architecture 700 may comprise or be implemented as part of computing system, such as computing system 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, gesture or motion recognition devices, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
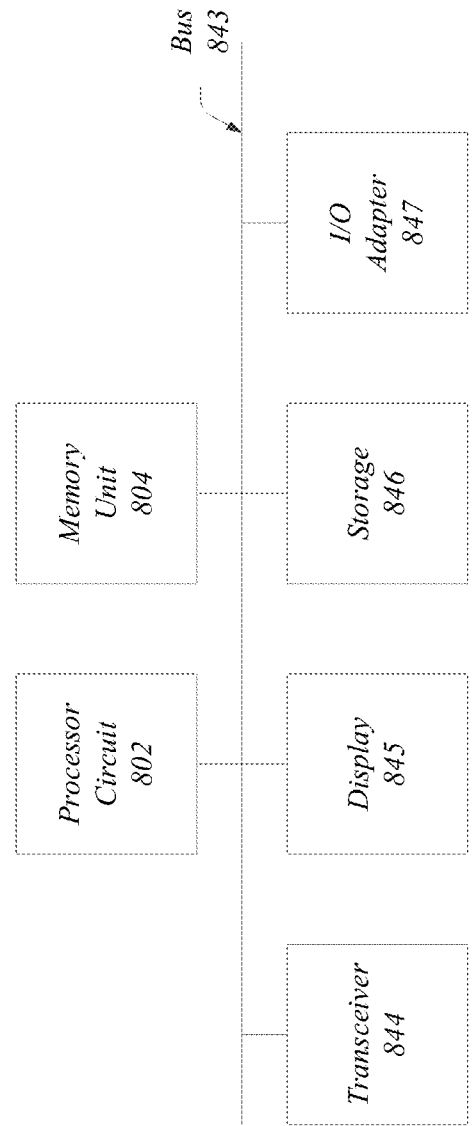
FIG. 8 illustrates an embodiment of a second computing architecture.

FIG. 8 illustrates one embodiment of a system 800. In various embodiments, system 800 may be representative of a system or architecture suitable for use with one or more embodiments described herein, such as computing system 100 of FIG. 1, logic flow 200 of FIG. 2, logic flow 300 of FIG. 3, logic flows 400 and 450 of FIG. 4A/4B and logic flow 600 of FIG. 6. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor, processing circuitry or logic device.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory. In some embodiments, the machine-readable or computer-readable medium may include a non-transitory medium. The embodiments are not limited in this context.

In various embodiments, system 800 may include a transceiver 844. Transceiver 844 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 844 may operate in accordance with one or more applicable standards in any version. The embodiments are not limited in this context.

In various embodiments, system 800 may include a display 845. Display 845 may constitute any display device capable of displaying information received from processor circuit 802.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

The detailed disclosure now turns to providing examples that pertain to further embodiments. Examples one through twenty-eight (1-28) provided below are intended to be exemplary and non-limiting.

Various embodiments are generally directed a system, device, apparatus and method for determining a size of a subtitle area in a subtitle image comprising subtitle information, creating a new subtitle image comprising the subtitle information, the new subtitle image having a same size as the size of the subtitle area and is smaller than the subtitle image and combining the new subtitle image with a video image for presenting the subtitle information.

In a first example, an apparatus or computing system may include processing circuitry, a subtitle size determination component for execution on the processing circuitry to determine a size of a subtitle area in a subtitle image comprising subtitle information, a subtitle creation component for execution on the processing circuitry to create a new subtitle image comprising the subtitle information, the new subtitle image having a same size as the size of the subtitle area and is smaller than the subtitle image. Further, an apparatus or computing device may include a subtitle composition component for execution on the processing circuitry to combine the new subtitle image with a video image for presenting the subtitle information.

In a second example and in furtherance of the first example, an apparatus or computing system may include a subtitle image comprising a plurality of lines of pixels, and also include a subtitle size determination component to process the plurality of lines in a top-to-bottom order or a bottom-to-top order, determine a minimum line value and a maximum line value in the subtitle image having subtitle information, determine a number of lines between the minimum line value and the maximum line value to determine the size of the subtitle area.

In a third example and in furtherance of any of the previous examples, an apparatus or computing system may include the subtitle size determination component to set the minimum line value to a lowest numbered line having subtitle information when processing the plurality of lines and to set the maximum line value to a highest numbered line having subtitle information when processing the plurality of lines.

In a fourth example and in furtherance of any of the previous examples, an apparatus or computing system may include the subtitle size determination component to set the minimum line value and the maximum line value to a default value prior to processing the plurality of lines.

In a fifth example and in furtherance of any of the previous examples, an apparatus or computing system may include the subtitle size determination component to determine whether a particular line of the plurality lines has subtitle information based on a summation of pixel values for the pixels in the particular line.

In a sixth example and in furtherance of any of the previous examples, an apparatus or computing system may include the subtitle size determination component to determine whether the subtitle information is in a top portion or a bottom portion of the subtitle image, and process the plurality of lines in the top-to-bottom order when the subtitle information is in the top portion of the subtitle image and in the bottom-to-top order when the subtitle information is in the bottom portion of the subtitle image.

In a seventh example and in furtherance of any of the previous examples, an apparatus or computing system may include the subtitle composition component to combine the new subtitle image comprising combining the new-subtitle image in a top portion or bottom portion of the video image based on whether the subtitle information is in the top portion of the subtitle image or the bottom portion of the subtitle image.

In an eighth example and in furtherance of any of the previous examples, a computer-implemented method may include determining a size of a subtitle area in a subtitle image comprising subtitle information, creating a new subtitle image comprising the subtitle information, the new subtitle image having a same size as the size of the subtitle area and is smaller than the subtitle image and combining the new subtitle image with a video image for presenting the subtitle information.

In a ninth example and in furtherance of any of the previous examples, a computer-implemented method may include processing the plurality of lines in a top-to-bottom order or a bottom-to-top order, determining a minimum line value and a maximum line value in the subtitle image having subtitle information and determining a number of lines between the minimum line value and the maximum line value to determine the size of the subtitle area.

In a tenth example and in furtherance of any of the previous examples, a computer-implemented method may include setting the minimum line value and the maximum line value to a default value, setting the minimum line value to a lowest numbered line having subtitle information when processing the plurality of lines and setting the maximum line value to a highest numbered line having subtitle information when processing the plurality of lines.

In an eleventh example and in furtherance of any of the previous examples, a computer-implemented method may include determining whether a particular line of the plurality lines has subtitle information based on a summation of pixel of values for the pixels in the particular line.

In a twelfth example and in furtherance of any of the previous examples, a computer-implemented method may include determining whether a particular line of the plurality lines has subtitle information based on a summation of pixel of values for the pixels in the particular line.

In a thirteenth example and in furtherance of any of the previous examples, a computer-implemented method may include determining whether the subtitle information is in a top portion or a bottom portion of the subtitle image and processing the plurality of lines in the top-to-bottom order when the subtitle information is in the top portion of the subtitle image and in the bottom-to-top order when the subtitle information is in the bottom portion of the subtitle image.

In a fourteenth example and in furtherance of any of the previous examples, a computer-implemented method may include combining the new-subtitle image in a top portion or bottom portion of the video image based on whether the subtitle information is in the top portion of the subtitle image or the bottom portion of the subtitle image.

In a fifteenth example and in furtherance of any of the previous examples, an article may include a plurality of instructions that when executed enable processing circuitry to determine a size of a subtitle area in a subtitle image comprising subtitle information, create a new subtitle image comprising the subtitle information, the new subtitle image having a same size as the size of the subtitle area and is smaller than the subtitle image and combine the new subtitle image with a video image for presenting the subtitle information.

In a sixteenth example and in furtherance of any of the previous examples, an article may include a plurality of instructions that when executed enable processing circuitry to process the plurality of lines in a top-to-bottom order or a bottom-to-top order, determine a minimum line value and a maximum line value in the subtitle image having subtitle information and determine a number of lines between the minimum line value and the maximum line value to determine the size of the subtitle area.

In a seventeenth example and in furtherance of any of the previous examples, an article may include a plurality of instructions that when executed enable processing circuitry to set the minimum line value and the maximum line value to a default value, set the minimum line value to a lowest numbered line having subtitle information when processing the plurality of lines and set the maximum line value to a highest numbered line having subtitle information when processing the plurality of lines.

In an eighteenth example and in furtherance of any of the previous examples, an article may include a plurality of instructions that when executed enable processing circuitry to set the default value for the minimum line value and the maximum line value to zero when processing the plurality lines in the top-to-bottom order and set the default value for the minimum line value and the maximum line value to a max value when the processing the plurality lines in the bottom-to-top order.

In a nineteenth example and in furtherance of any of the previous examples, an article may include a plurality of instructions that when executed enable processing circuitry to determining whether a particular line of the plurality lines has subtitle information based on a summation of pixel of values for the pixels in the particular line.

In a twentieth example and in furtherance of any of the previous examples, an article may include a plurality of instructions that when executed enable processing circuitry to determine whether the subtitle information is in a top portion or a bottom portion of the subtitle image and process the plurality of lines in the top-to-bottom order when the subtitle information is in the top portion of the subtitle image and in the bottom-to-top order when the subtitle information is in the bottom portion of the subtitle image.

In a twenty-first example and in furtherance of any of the previous examples, an article may include a plurality of instructions that when executed enable processing circuitry to combine the new-subtitle image in a top portion or bottom portion of the video image based on whether the subtitle information is in the top portion of the subtitle image or the bottom portion of the subtitle image.

In a twenty-second example and in furtherance of any of the previous examples, an apparatus may include means for determining a size of a subtitle area in a subtitle image comprising subtitle information, means for creating a new subtitle image comprising the subtitle information, the new subtitle image having a same size as the size of the subtitle area and is smaller than the subtitle image and means for combining the new subtitle image with a video image for presenting the subtitle information.

In a twenty-third example and in furtherance of any of the previous examples, an apparatus may include means for processing the plurality of lines in a top-to-bottom order or a bottom-to-top order, means for determining a minimum line value and a maximum line value in the subtitle image having subtitle information and means for determining a number of lines between the minimum line value and the maximum line value to determine the size of the subtitle area.

In a twenty-fourth example and in furtherance of any of the previous examples, an apparatus may include means for setting the minimum line value and the maximum line value to a default value, means for setting the minimum line value to a lowest numbered line having subtitle information when processing the plurality of lines and means for setting the maximum line value to a highest numbered line having subtitle information when processing the plurality of lines.

In a twenty-fifth example and in furtherance of any of the previous examples, an apparatus may include means for setting the default value for the minimum line value and the maximum line value to zero when processing the plurality lines in the top-to-bottom order and means for setting the default value for the minimum line value and the maximum line value to a max value when the processing the plurality lines in the bottom-to-top order.

In a twenty-sixth example and in furtherance of any of the previous examples, an apparatus may include means for determining whether a particular line of the plurality lines has subtitle information based on a summation of pixel of values for the pixels in the particular line.

In a twenty-seventh example and in furtherance of any of the previous examples, an apparatus may include means for determining whether the subtitle information is in a top portion or a bottom portion of the subtitle image and means for processing the plurality of lines in the top-to-bottom order when the subtitle information is in the top portion of the subtitle image and in the bottom-to-top order when the subtitle information is in the bottom portion of the subtitle image.

In a twenty-eighth example and in furtherance of any of the previous examples, an apparatus may include means for combining the new-subtitle image in a top portion or bottom portion of the video image based on whether the subtitle information is in the top portion of the subtitle image or the bottom portion of the subtitle image.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:
1. An apparatus, comprising:
   processing circuitry;
   a subtitle size determination component for execution on the processing circuitry to determine a size of a subtitle area in a subtitle image comprising subtitle information;
   a subtitle creation component for execution on the processing circuitry to create a new subtitle image comprising the subtitle information, the new subtitle image having a same size as the size of the subtitle area and is smaller than the subtitle image; and
   a subtitle composition component for execution on the processing circuitry to combine the new subtitle image with a video image for presenting the subtitle information.
2. The apparatus of claim 1, the subtitle image comprising a plurality of lines of pixels, and the subtitle size determination component to:
   process the plurality of lines in a top-to-bottom order or a bottom-to-top order;
   determine a minimum line value and a maximum line value in the subtitle image having subtitle information; and determine a number of lines between the minimum line value and the maximum line value to determine the size of the subtitle area.

3. The apparatus of claim 2, the subtitle size determination component to set the minimum line value to a lowest numbered line having subtitle information when processing the plurality of lines and to set the maximum line value to a highest numbered line having subtitle information when processing the plurality of lines.

4. The apparatus of claim 2, the subtitle size determination component to set the minimum line value and the maximum line value to a default value prior to processing the plurality of lines.

5. The apparatus of claim 2, the subtitle size determination component to determine whether a particular line of the plurality lines has subtitle information based on a summation of pixel values for the pixels in the particular line.

6. The apparatus of claim 2, the subtitle size determination component to determine whether the subtitle information is in a top portion or a bottom portion of the subtitle image, and process the plurality of lines in the top-to-bottom order when the subtitle information is in the top portion of the subtitle image and in the bottom-to-top order when the subtitle information is in the bottom portion of the subtitle image.

7. The apparatus of claim 6, the subtitle composition component to combine the new subtitle image comprising combining the new-subtitle image in a top portion or bottom portion of the video image based on whether the subtitle information is in the top portion of the subtitle image or the bottom portion of the subtitle image.

8. The apparatus of claim 1, comprising:
a memory coupled with the processing circuitry;
a transceiver coupled with the processing circuitry; and
a display device coupled with the processing circuitry.

9. A computer-implemented method, comprising:
determining a size of a subtitle area in a subtitle image comprising subtitle information;
creating a new subtitle image comprising the subtitle information, the new subtitle image having a same size as the size of the subtitle area and is smaller than the subtitle image; and
combining the new subtitle image with a video image for presenting the subtitle information.

10. The computer-implemented method of claim 9, the subtitle image comprising a plurality of lines of pixels, and the method comprising:
processing the plurality of lines in a top-to-bottom order or a bottom-to-top order;
determining a minimum line value and a maximum line value in the subtitle image having subtitle information; and
determining a number of lines between the minimum line value and the maximum line value to determine the size of the subtitle area.

11. The computer-implemented method of claim 10, comprising:
setting the minimum line value and the maximum line value to a default value;
setting the minimum line value to a lowest numbered line having subtitle information when processing the plurality of lines; and
setting the maximum line value to a highest numbered line having subtitle information when processing the plurality of lines.

12. The computer-implemented method of claim 11, comprising:
setting the default value for the minimum line value and the maximum line value to zero when processing the plurality lines in the top-to-bottom order; and
setting the default value for the minimum line value and the maximum line value to a max value when the processing the plurality lines in the bottom-to-top order.

13. The computer-implemented method of claim 10, comprising:
determining whether a particular line of the plurality lines has subtitle information based on a summation of pixel of values for the pixels in the particular line.

14. The computer-implemented method of claim 13, combining the new subtitle image comprising:
combining the new-subtitle image in a top portion or bottom portion of the video image based on whether the subtitle information is in the top portion of the subtitle image or the bottom portion of the subtitle image.

15. The computer-implemented method of claim 10, comprising:
determining whether the subtitle information is in a top portion or a bottom portion of the subtitle image; and
processing the plurality of lines in the top-to-bottom order when the subtitle information is in the top portion of the subtitle image and in the bottom-to-top order when the subtitle information is in the bottom portion of the subtitle image.

16. At least one non-transitory computer-readable storage medium comprising a plurality of instructions that when executed enable processing circuitry to:
determine a size of a subtitle area in a subtitle image comprising subtitle information;
create a new subtitle image comprising the subtitle information, the new subtitle image having a same size as the size of the subtitle area and is smaller than the subtitle image; and
combine the new subtitle image with a video image for presenting the subtitle information.

17. The medium of claim 16, comprising instructions that when executed enable the processing circuitry to:
process the plurality of lines in a top-to-bottom order or a bottom-to-top order;
determine a minimum line value and a maximum line value in the subtitle image having subtitle information; and
determine a number of lines between the minimum line value and the maximum line value to determine the size of the subtitle area.

18. The medium of claim 17, comprising instructions that when executed enable the processing circuitry to:
set the minimum line value and the maximum line value to a default value;
set the minimum line value to a lowest numbered line having subtitle information when processing the plurality of lines; and
set the maximum line value to a highest numbered line having subtitle information when processing the plurality of lines.

19. The medium of claim 18, comprising instructions that when executed enable the processing circuitry to:
set the default value for the minimum line value and the maximum line value to zero when processing the plurality lines in the top-to-bottom order; and
set the default value for the minimum line value and the maximum line value to a max value when the processing the plurality lines in the bottom-to-top order.

20. The medium of claim 17, comprising instructions that when executed enable the processing circuitry to:
    determining whether a particular line of the plurality lines has subtitle information based on a summation of pixel of values for the pixels in the particular line.

21. The medium of claim 20, comprising instructions that when executed enable the processing circuitry to:
    combine the new-subtitle image in a top portion or bottom portion of the video image based on whether the subtitle information is in the top portion of the subtitle image or the bottom portion of the subtitle image.

22. The medium of claim 17, comprising instructions that when executed enable the processing circuitry to:
    determine whether the subtitle information is in a top portion or a bottom portion of the subtitle image; and
    process the plurality of lines in the top-to-bottom order when the subtitle information is in the top portion of the subtitle image and in the bottom-to-top order when the subtitle information is in the bottom portion of the subtitle image.

* * * * *